(12) United States Patent
Gupta et al.

(10) Patent No.: US 7,426,611 B1
(45) Date of Patent: Sep. 16, 2008

(54) METHOD AND SYSTEM FOR IMPROVED STORAGE SYSTEM PERFORMANCE USING CLONING OF CACHED DATA

(75) Inventors: Vivek V. Gupta, Pune (IN); Basant Rajan, Pune (IN); Angshuman Bezbaruah, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 167 days.

(21) Appl. No.: 10/642,862

(22) Filed: Aug. 18, 2003

(51) Int. Cl.
*G06F 12/08* (2006.01)
(52) U.S. Cl. .................. 711/119; 711/113; 711/122
(58) Field of Classification Search ......... 711/112–114, 711/119
See application file for complete search history.

(56) References Cited

U.S. PATENT DOCUMENTS

| 5,485,598 | A | * | 1/1996 | Kashima et al. | 714/6 |
| 5,829,038 | A | * | 10/1998 | Merrell et al. | 711/143 |
| 5,890,207 | A | * | 3/1999 | Sne et al. | 711/113 |

* cited by examiner

*Primary Examiner*—Pierre-Michel Bataille
*Assistant Examiner*—Hetul Patel
(74) *Attorney, Agent, or Firm*—Campbell Stephenson LLP

(57) ABSTRACT

A method for improving storage system performance is disclosed. The method includes cloning information stored in a first unit of storage in a second unit of storage. The first unit of storage is stored in a first cache maintained by an upper-level system, while the second unit of storage is stored in a second cache.

37 Claims, 17 Drawing Sheets

METHOD AND SYSTEM FOR IMPROVED STORAGE SYSTEM PERFORMANCE USING CLONING OF CACHED DATA

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to the field of data storage devices, and more particularly relates to a method and system for improving the performance of storage systems via the cloning of units of storage.

2. Description of the Related Art

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters. This is particularly true of the data storage systems that maintain such businesses information.

With this growing focus on data storage, it has become desirable to implement commercial-grade storage performance and reliability akin to those of mainframe disk subsystems in a more cost-effective manner. In response to this need, techniques have been developed that abstract multiple disks into single storage objects, using commodity disks (such as SCSI and IDE drives) and system buses (such as ISA, EISA, PCI, and SBus). A data storage system employing this abstraction of multiple disks into a single storage object is referred to generically as a Redundant Arrays of Independent Disks (RAID) or RAID array.

A number of RAID types (referred to as RAID levels) have been defined, each offering a unique set of performance and data-protection characteristics. Originally, several RAID configurations (often called RAID levels) were proposed. (RAID levels are often abbreviated as RAID-x; for example, RAID level 5 may be abbreviated as RAID-5.) In addition to RAID levels 2 through 6, which use parity calculations to provide redundancy, two other disk configurations were retroactively labeled as RAID: striping, or interleaving data across disks with no added redundancy, was identified as RAID level 0, and mirroring, maintaining full redundant data copies, was identified as RAID level 1.

The important characteristics of each major RAID level are now presented. While RAID-0 offers no increased reliability, it can supply performance acceleration at no increased storage cost by sharing I/O accesses among multiple disks. By contrast, RAID-1 provides the highest performance for redundant storage, because read-modify-write cycles are not required when updating data (as required in RAID-5 storage systems). Moreover, multiple copies of data may be used in order to accelerate read-intensive applications. However, RAID-1 requires at least double the disk capacity (and therefore, at least double the disk expenditures) of a non-RAID-1 solution. RAID-1 is most advantageous in high-performance and write-intensive applications. Also, since more than two copies may be used, RAID-1 arrays can be constructed to withstand loss of multiple disks without suffering an interruption in service.

Use of mirroring (or RAID level 1) increases data availability and read I/O performance, at the cost of sufficient storage capacity for fully redundant copies. RAID levels 2 through 5 address data redundancy by storing a calculated value (commonly called parity, or parity information), which can be used to reconstruct data after a drive failure or system failure, and to continue servicing input/output (I/O) requests for the failed drive.

In order to increase reliability while preserving the performance benefits of striping, it is possible to configure objects which are both striped and mirrored. While not explicitly numbered as standard RAID configurations, such a combination is sometimes called RAID-1+0, RAID-0+1, or RAID-10. This configuration is achieved by striping several disks together, then mirroring the striped sets to each other, producing mirrored stripes. When striped objects are mirrored together, each striped object is viewed as if it were a single disk. If a disk becomes unavailable due to error, that entire striped object is disabled. A subsequent failure on the surviving copy would make all data unavailable. It is, however, extremely rare that this would occur before the disk could be serviced. In addition, use of hot spares makes this even less likely.

Among the parity RAID configurations, RAID-2 uses a complex Hamming code calculation for parity, and is not typically found in commercial implementations. RAID levels 3, 4 and 5 are, by contrast, often implemented. Each uses an exclusive-or (XOR) calculation to check and correct missing data. RAID-3 distributes bytes across multiple disks. RAID-4 and RAID-5 arrays compute parity on an application-specific block size, called an interleave or stripe unit, which is a fixed-size data region that is accessed contiguously. All stripe units at the same depth on each drive (called the altitude) are used to compute parity. This allows applications to be optimized to overlap read access by reading data off a single drive while other users access a different drive in the RAID. These types of parity striping require write operations to be combined with read and write operations for disks other than the ones actually being written, in order to update parity correctly. RAID-4 stores parity on a single disk in the array, while RAID-5 removes a possible bottleneck on the parity drive by rotating parity across all drives in the set.

RAID 5 protects the data for n disks with a single disk that is the same size as the smallest disk in the array. RAID 5 usable capacity equals s*[n−1], where s is the capacity of the smallest disk in the array and n is the total number of disks in the array. Not only does a RAID 5 array offer a very efficient way to protect data, such an array also has read performance similar to a RAID 0 array, although write performance suffers in comparison to a single disk (due to the read/modify/write cycle for writes, discussed subsequently). Because of its combination of data protection and performance, RAID 5 is popular for general-purpose servers such as file and Web servers.

The parity information generated is simply the result of an XOR operation on all the data elements in the stripe. Because XOR is an associative and commutative operation, to find the XOR result of multiple operands, one starts by simply performing the XOR operation of any two operands. Subsequently, one performs an XOR operation on the result with the next operand, and so on with all of the operands, until the final result is reached. Additionally, parity rotation is implemented to improve performance, as discussed subsequently.

A RAID 5 volume can thus tolerate the loss of any one disk without data loss. The missing data for any stripe is easily determined by performing an XOR operation on all of the remaining data elements for that stripe. If the host requests a RAID controller to retrieve data from a disk array that is in a degraded state, the RAID controller first reads all of the other data elements on the stripe, including the parity data element. It then performs all of the XOR calculations before returning the data that would have resided on the failed disk. All of this happens without the host being aware of the failed disk, and array access continues.

The RAID 5 write operation is responsible for generating the requisite parity data, an operation which is typically referred to as a read/modify/write operation (alternatively, a read/modify/log/write operation, if logging is implemented). This process, as will be appreciated, is time-consuming, in comparison to simply writing data to disk. This is substantial overhead, even in the case where the entire stripe is being written (a full stripe write).

FIG. 1A is a flow diagram illustrating a process of a full stripe write according to methods of the prior art. As will be appreciated, a typical write operation, for example in a RAID-5 volume, can be very expensive, both in terms of the resources required and the computational loads placed on the storage system and computing facilities involved. If the write is a full stripe write (as in the example here), the write is usually performed in three phases. In the first phase, parity information is computed (step 100). This is also referred to as the modify phase. In the next phase, the data and parity are logged (step 110). A RAID-5 volume may also have a log device that logs data, as well as parity information, during a write operation. Such a log allows for fast parity resynchronization and avoids data loss during one-and-half failures. This phase is also referred to as the logging phase. In the last phase, data and parity information are written to the storage system (step 120). This phase is also referred to as the write phase.

The overhead associated with this kind of operation is even more onerous in the case of a partial stripe write, in terms of overhead per unit of data written. Consider a stripe composed of a number of strips (i.e., stripe units) of data and one strip of parity information, as is the normal case. Suppose the host wants to change just a small amount of data that takes up the space on only one strip within the stripe. The RAID controller cannot simply write that small portion of data and consider the request complete. It must also update the parity data. One must remember that the parity data is calculated by performing XOR operations on every strip within the stripe. So when one or more strips change, parity needs to be recalculated using all strips, regardless of the amount of data actually changed. This mandates reading the information from the other (unchanging) strips, even though the data read, once used, will simply be discarded.

FIG. 1B is a flow diagram illustrating a partial stripe write according to methods of the prior art. A partial stripe write typically involves four phases. In the first phase, old data and parity information are read from the storage system (step 130). This phase is also referred to as the read phase. Next, parity information is computed (step 140). The phase is, as before, also referred to as the modify phase. Next, also as before, data logging is performed (step 150), and is again referred to as the logging phase. Finally, data and parity information are written to the storage system (step 160), which is referred to as the write phase, as before.

In greater detail, the read/modify/write operation can be broken down into the following actions:
1. Read new data from application.
2. Read old data from target disk for new data.
3. Read old parity from target stripe for new data.
4. Calculate new parity with an XOR calculation on the data from steps 1, 2, and 3.
5. Indicate potential lack of coherency. (Since it is not possible to guarantee that the new target data and new parity can be written to separate disks atomically, the RAID subsystem must identify that the stripe being processed is inconsistent.)
6. Write new data to target location.
7. Write new parity.
8. Indicate coherency restored. (The new target data and new parity information have been successfully written.)

It will be noted that the parity disk is involved in every write operation (steps 3 and 7). This is why parity is rotated to a different disk with each stripe. If the parity were all stored on the same disk all of the time, that disk could become a performance bottleneck.

Because of its combination of data protection and performance, RAID-5 is a popular alternative for a variety of commercial applications. However, reads are actually an integral part of a RAID-5 write (as well as reads, naturally), making read performance an important criteria in implementing a RAID-5 array. This issue of read performance also impacts the performance of storage systems implementing copy-on-write snapshots, as will be appreciated from the following discussion in connection with FIG. 1C.

FIG. 1C is a flow diagram illustrating a process of making a copy-on-write snapshot according to methods of the prior art. Such copy-on-write snapshots can be, for example, full-image snapshots, spaced-optimized snapshots or the like. As will be appreciated, writing to a volume having snapshots requires that the volume manager read the old contents of the region to be written, and to copy those old contents to the snapshots being made, before actually overwriting the region to be written to with the new application data. The process begins with the reading of the region's old contents (step 170). Next, the old contents are copied to the snapshots being made (step 180). Finally, the new application data can be written to these regions (step 190). As with read operations in RAID arrays, the performance of read operations in a storage system implementing copy-on-write snapshots is an important consideration in providing acceptable performance levels in such systems.

As will be appreciated, therefore, it is desirable to improve the performance of storage systems, such as those described above, for a variety of reasons. What is therefore needed is a technique that addresses the delays inherent in such storage systems, and, in particular, delays related to the read operations that must be performed in supporting techniques such as those discussed above. Moreover, such a solution should preferably do so without affecting the basic storage paradigm employed.

SUMMARY OF THE INVENTION

The present invention provides a method and system that addresses the foregoing limitations by avoiding the need to perform a read operation in certain circumstances. The present invention achieves this by cloning a unit of storage (e.g., a page or region), caching the existing data within that unit of storage in another unit of storage (e.g., in a "cloned page cache" or "old data cache" (i.e., a cache for old data)) prior to the unit of storage being written to. For example, in a storage system of the present invention, an existing page's old data is copied to a free page in an old data cache (resulting in a cloned page), prior to the existing page being modified.

This is particularly effective when the data is already cached (e.g., in a filesystem cache or volume manager cache), as the data is then immediately available for cloning. For example, if an upper-level system (e.g., a filesystem, a database application, a firmware module or the like) caches pages, those pages can be cloned into pages kept in a separate cache referred to herein as an old data cache. This old data cache (e.g., a cloned page cache) can be maintained by the upper-level system, a lower-level storage module (e.g., a volume manager), or by some other stand-alone module. Once cached in an old data cache, the information in the cloned page can be used in situations in which that information would typically be read from a storage system. Thus, in the examples discussed previously, if the requisite page has been cloned (and is thus available from the old data cache), the cloned page can be used rather than reading that page from the storage system, thereby avoiding that initial read operation by the lower-level storage module.

In one embodiment, a method for improving storage system performance is disclosed. The method includes cloning information stored in a first unit of storage in a second unit of storage. The first unit of storage is stored in a first cache maintained by an upper-level system, while the second unit of storage is stored in a second cache. This second cache is referred to herein as an old data cache.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following detailed description, including the appended claims, in connection with the above-described drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent to one skilled in the art, however, that the present invention can be employed without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

An Example Storage Architecture

Figure 1A:
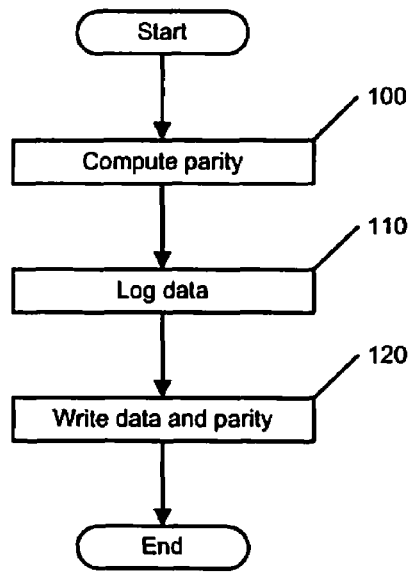
FIG. 1A is a flow diagram illustrating a process of a full stripe write according to the prior art.
Figure 1B:
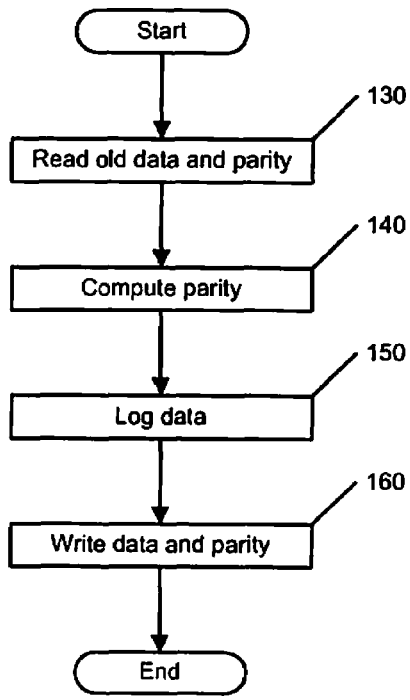
FIG. 1B is a flow diagram illustrating a process of a partial stripe write according to the prior art.
Figure 1C:
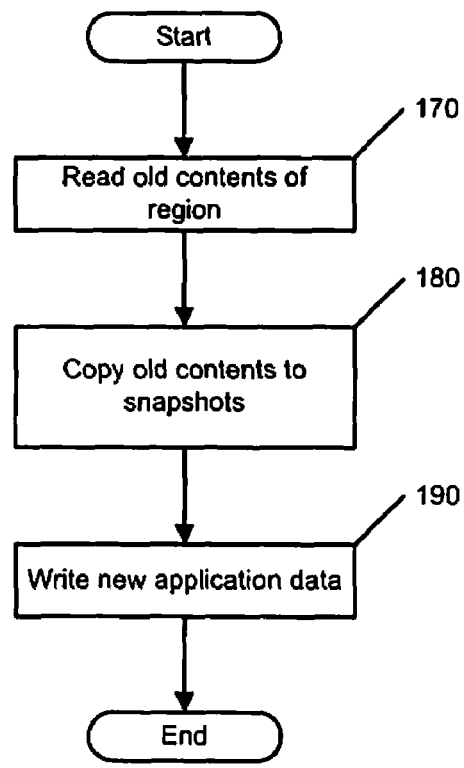
FIG. 1C is a flow diagram illustrating a process of making a copy-on-write snapshot according to the prior art.
Figure 2:
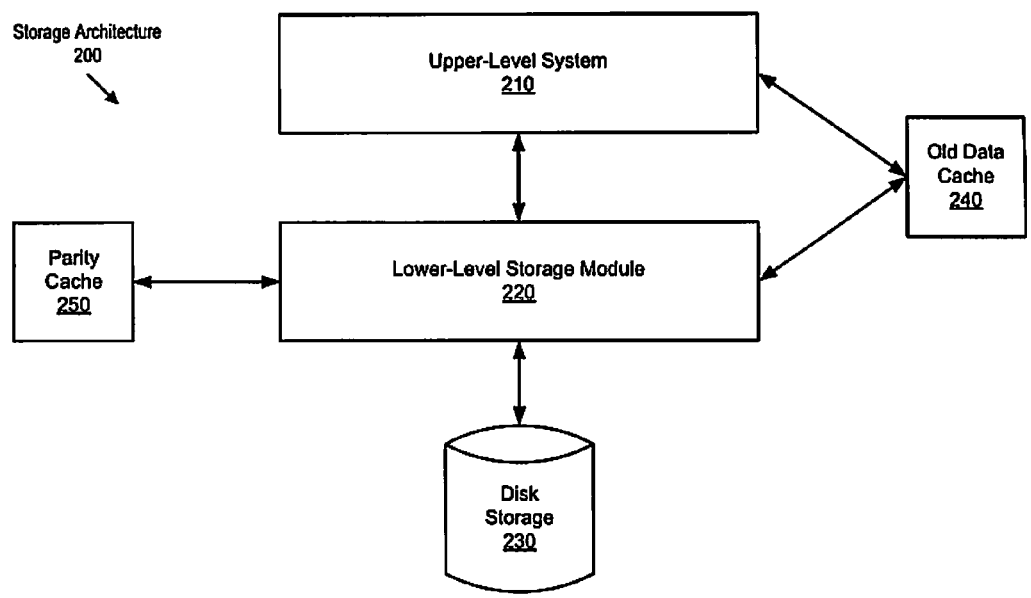
FIG. 2 is a block diagram illustrating a software architecture supporting page cloning according to embodiments of the present invention.

FIG. 2 is a block diagram illustrating a storage architecture 200 that supports cloning according to embodiments of the present invention. Storage architecture 200 includes an upper-level system 210 and a lower-level storage module 220. Lower-level storage module 220 manages disk storage 230, in order to provide upper-level system 210 access to disk storage 230. It will be appreciated that disk storage 230 can be implemented as a RAID array, a JBOD array, a single disk drive, some other disk configuration, or even some other type of storage unit.

It also will be appreciated that, although referred to in terms of disks, disk storage 230 can be implemented using any storage technology, including hard disks, RAM disks, optical disks, tape or other media. Also included in storage architecture 200 is an old data cache 240 (also referred to herein as a cloned page cache). Old data cache 240 can be accessed by both upper-level system 210 and lower-level storage module 220. In various embodiments, upper-level system 210 can be a filesystem, a database application, a firmware module, an application-specific integrated circuit (ASIC) or some other hardware or software module that employs lower-level storage module 220 in accessing disk storage 230. Lower-level storage module 220 can be, for example, a volume manager or some other hardware or software module capable of managing disk storage 230.

In various embodiments of the present invention, old data cache 240 can be primarily associated with upper-level system 210 or lower-level storage module 220. Alternatively, old data cache 240 can be implemented as a separate caching module, and configured to service requests for the creation of cache pages, writes to/reads from cache pages, the destruction of cache pages, and the like. Thus, in certain embodiments, upper-level system 210 includes old data cache 240, and provides access to old data cache 240 to lower-level storage module 220. In other embodiments, old data cache 240 is primarily under the control of lower-level storage module 220, which provides upper-level system 210 with access thereto. In still other embodiments, old data cache 240 is an independent caching module, and so is not under the primary control of upper-level system 210 or lower-level storage module 220.

Also depicted in FIG. 2 is a parity cache 250. Parity cache 250 is used by lower-level storage module 220 in applications in which disk storage 230 is implemented as a RAID array. In such implementation, parity cache 250 is used to maintain parity information regarding information stored in disk storage 230, prior to the writing of that parity information to disk storage 230.

Figure 2A:
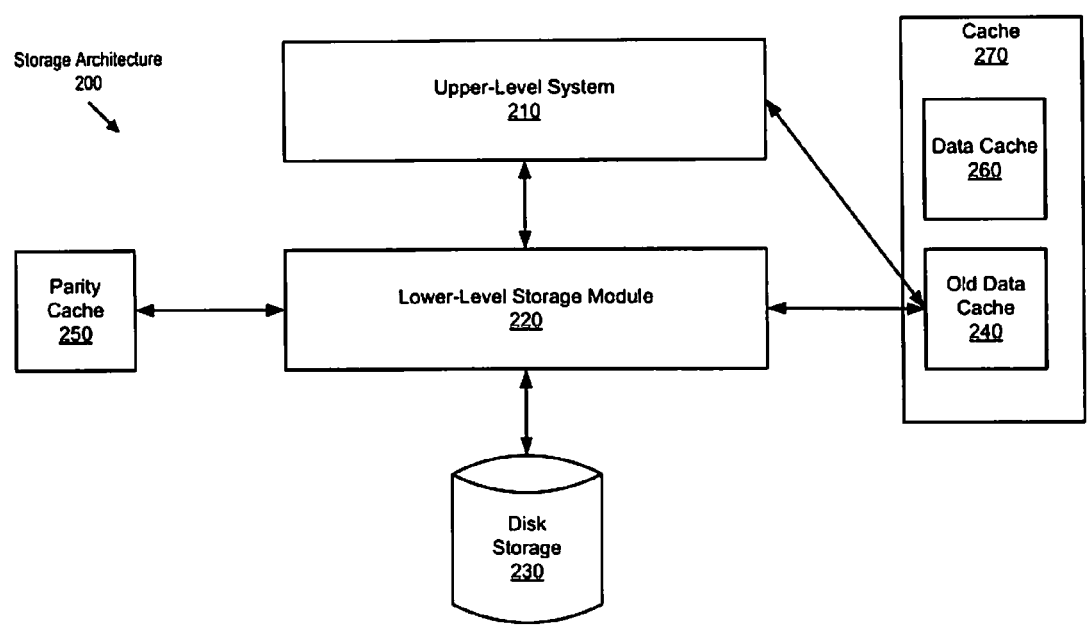
FIG. 2A is a block diagram illustrating a software architecture supporting page cloning according to embodiments of the present invention.

FIG. 2A depicts data cache 260. In certain embodiments, a single cache 270 comprises data cache 260 and old data cache 240.

General Examples of Partial Stripe Writes and Copy-On-Write Snapshot Processes

Figure 3A:
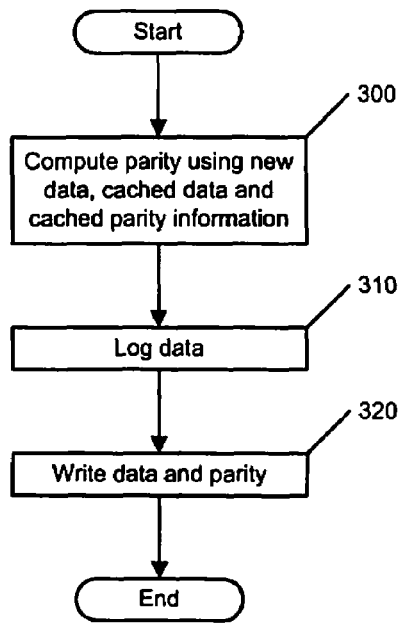
FIG. 3A is a flow diagram illustrating a process of a partial stripe write according to embodiments of the present invention.

FIG. 3A is flow diagram illustrating a process of a partial stripe write according to embodiments of the present invention. In this scenario, the data (which would have otherwise had to have been read from disk storage 230) is now available from old data cache 240. That being the case, the read operation that would have normally been performed is avoided. Thus, the process of a partial stripe write begins with the computation of parity information, which uses the data cached according to the present invention (step 300). As before, the data is then logged (step 310), and data and parity information are written to disk storage 230 (step 320).

Figure 3B:
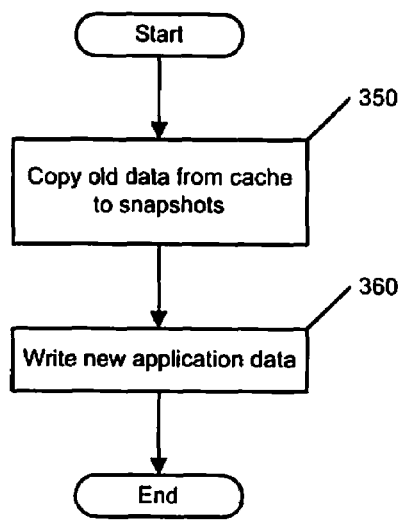
FIG. 3B is a flow diagram illustrating a process of writing to a volume having copy-on-write snapshots according to embodiments of the present invention.

FIG. 3B is a flow diagram illustrating a process of writing to a volume having copy-on-write snapshots according to embodiments of the present invention. As with the process depicted in FIG. 3A, the read operation (in this case, the reading of the old contents of the region in question) is avoided, with the data being made available via old data cache 240. In this case, as the old data is already available from the cache, the old data can be quickly copied to a snapshot (step 350). Once the data is written to the snapshot, the new application data can be written to the affected region (step 360).

It will be noted that various processes according to embodiments of the present invention are discussed herein (e.g., with reference to FIGS. 3A and 3B). It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

These operations may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

The software modules described herein may be received by a computer system, for example, from computer readable media. The computer readable media may be permanently, removably or remotely coupled to the computer system. Such computer readable media can include, for example: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media can be used to store and/or transmit the software modules discussed herein.

Figure 4:
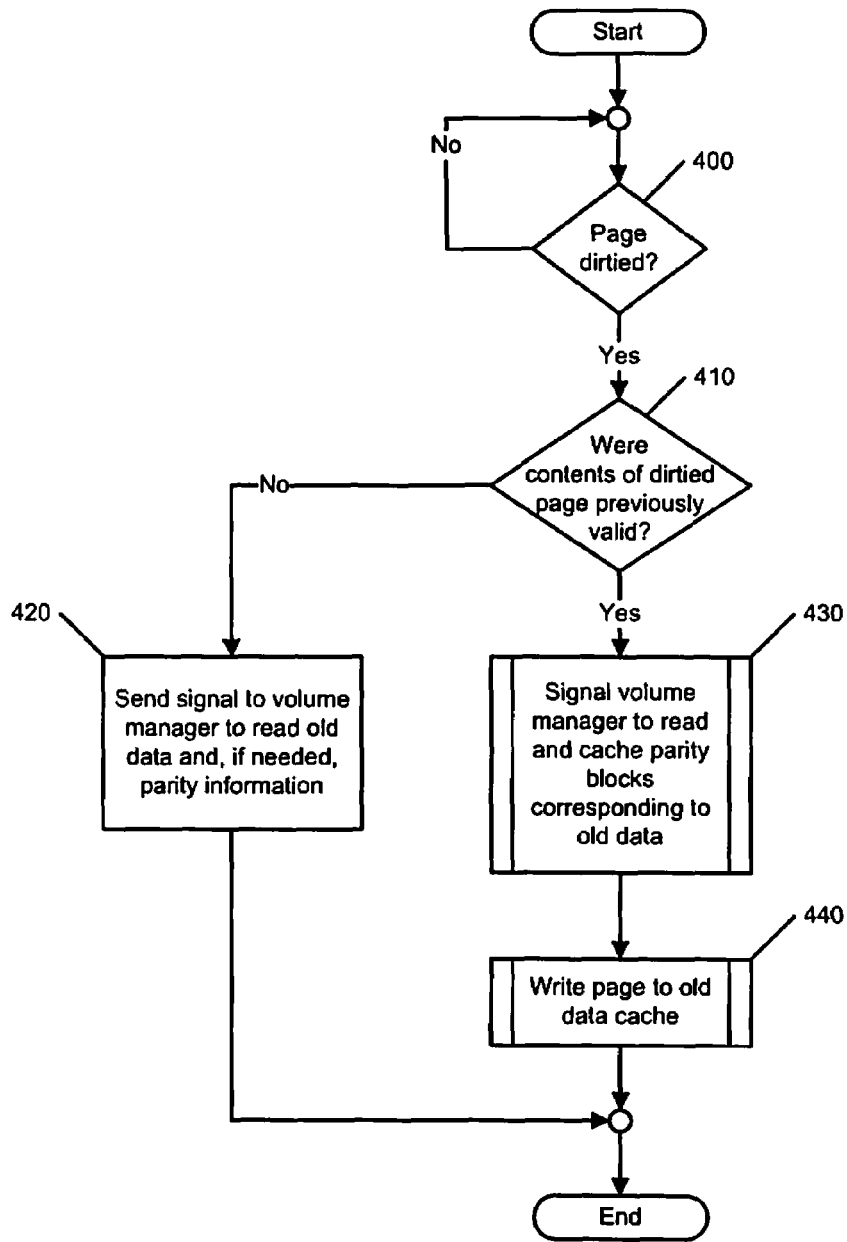
FIG. 4 is a flow diagram illustrating a process of page cloning using a volume manager cache, according to embodiments of the present invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like. Each of the processes described herein can be executed by a module (e.g., a software module) or a portion of a module or a computer system user using, for example, a computer system such as that discussed subsequently in connection with FIG. 14.

Example Processes for Partial Stripe Writes Using a Volume Manager Cache FIG. 4 is a flow diagram illustrating a process of page cloning using a volume manager-managed old data cache according to embodiments of the present invention. The process begins with a determination as to whether a given page has been dirtied (step 400). Once a page has been dirtied, a determination is made as to whether the contents of that page were previously valid (step 410). As will be appreciated, a page's content is valid when those contents are synchronized with the data stored in storage (e.g., disk storage 230). If the contents of the dirtied page were not previously valid, the filesystem sends a signal to the volume manager indicating that the volume manager should read the old data (as would normally be the case) (step 420). If needed (e.g., in the case of a RAID-5 volume (as opposed to a volume having copy-on-write snapshots)), the volume manager also reads parity information at this point.

However, if the contents of the dirtied page are valid, a signal is sent to the volume manager by the filesystem, indicating that the volume manager should read and cache the parity blocks corresponding to the old data (step 430). It will be noted that parity information is only needed in the case where the underlying storage strategy requires such information. An example would be a RAID array (e.g., RAID-3, RAID-4, RAID-5 or RAID-6). Thus, parity information will be needed in the case of the management of a RAID-5 volume. However, only the old data will be necessary if no parity information is required (e.g., in the case of a copy-on-write snapshot methodology). The reading and caching of parity information is discussed in further detail in connection with FIG. 5. The page that will be dirtied is also written to the old data cache (e.g., old data cache 240) (step 440). The writing of the page to an old data cache is discussed in further detail with regard to FIG. 6. As will be appreciated, the volume manager will then complete the write, carrying out the modify/log/write phases of the write operation. The performance of these phases is discussed in further detail in connection with FIG. 7.

Using a technique according to the present invention, whenever a filesystem dirties a page having valid contents (i.e., contents that are synchronized with the data stored in the storage system), the filesystem can clone the page, copying the existing contents into the new page before modifying the old page. The filesystem also signals the volume manager, indicating that the volume manager should read and cache the corresponding parity information (parity block(s)). The cloned page is then used by the volume manager in completing the other phases of the write operation being performed. Subsequent modifications to the paged data go to the original page. When this dirty (original) page is flushed by the filesystem, resulting in a volume write, the volume manager can completely eliminate the read phase of the write operation, since the volume manager now has at its disposal the old data (in the cloned page) and old parity (in the cached parity blocks).

A technique according to the present invention also avoids unnecessary data duplication, since the cached contents (i.e. the cloned pages) are the ones that are going to be useful when the dirty page flushes (and hence the RAID-5 volume writes) eventually take place. This ability to achieve what is basically a 100% cache hit rate is a significant advantage of techniques according to the present invention. Moreover, as noted elsewhere, a technique according to the present invention can easily be extended to any application running on top of a lower-level storage management application (e.g., a volume manager) that performs its own cache management, such as database applications, by providing an application programming interface for the management of cloned pages and the upper-level system's interactions with the lower-level storage management application.

As will be appreciated, the cloned page can be freed after the modified data has been successfully flushed to the disk, depending on the given implementation (primarily, whether the data in the cloned page is expected to be needed subsequently). A set of interfaces is therefore needed by the volume manager to use the cloned pages. The management of the cloned pages, in one embodiment, is handled by the filesystem. The filesystem exports a set of interfaces to the volume manager, which the volume manager can invoke in order to use the cloned pages. The management of such interfaces is controlled by the filesystem in this scenario. Alternatively, these cloned pages can also be managed by the volume manager (with the set of interfaces exported to the filesystem), or even by a caching module that is independent of the filesystem and volume manager (with the set of interfaces exported to both the volume manager and the filesystem).

In the case where volume manager maintains a pool of pages that the filesystem can use to store old or existing data (an old data cache such as a cloned page cache, as described above), the filesystem can employ, for example, the following interfaces to perform the requisite functions:

1. Acquire_Page( )—Acquire a free page, which is used by the filesystem to hold a page.
2. Populate_Page ( )—Populate the free page, making the free page a cloned page, which is used by the filesystem to copy old data into the free page.
3. Create_Page_Identity ( )—Create an identity for a page, which is used by the filesystem to name the page that the filesystem populated.
4. Destroy_Page_Identity ( )—Destroy the identity for a page, which is used by the filesystem to hint that this page is no longer useful.
5. Find_Page ( )—Check if a page with a given identity exists, which is used by the filesystem to avoid duplication of cloned pages.
6. Add_Page ( )—Add a populated page to the old data cache after creating the page's identity.

Additionally, the volume manager needs to maintain all standard cache management primitives required for maintaining the cache (old data cache, or simply cache, depending if taking the perspective of the functionality associated with the present invention, or that conventionally available in the volume manager).

Typically, in the case of memory mapped writes, the filesystem is not notified of the occurrence of such writes, and so is unaware that any action is required. The filesystem therefore cannot be tasked with the cloning of the requisite information in such a case. Thus, in certain operating systems, such situations may require interfacing with the virtual memory system of the operating system in order to ensure that the modified page is cloned prior to its being modified. In this case, the cloning is performed by the virtual memory system (e.g., rather than the filesystem). It will also be noted that, in the case where the volume manager maintains the cache, the cloned pages are keyed on device identifiers and offsets within them, and not file identifiers and offsets therein.

Figure 5:
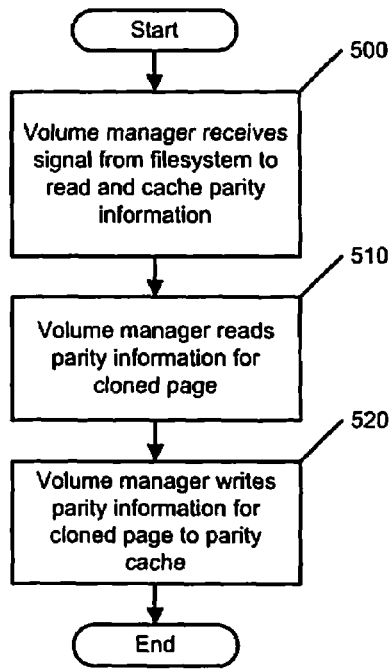
FIG. 5 is a flow diagram illustrating a process for caching parity information corresponding to a cloned page, according to embodiments of the present invention.

FIG. 5 is a flow diagram illustrating a process for caching parity information corresponding to a cloned page according to embodiments of the present invention. The process begins with the reception, by the volume manager, of a signal from the filesystem, indicating that the volume manager should read and cache the parity information corresponding to the page to be dirtied (step 500). In response, the volume manager reads the requisite parity information for the page to be cloned (step 510). After reading this information, the volume manager writes the parity information for the cloned page to the parity cache (e.g., parity cache 250) (step 520).

Figure 6:
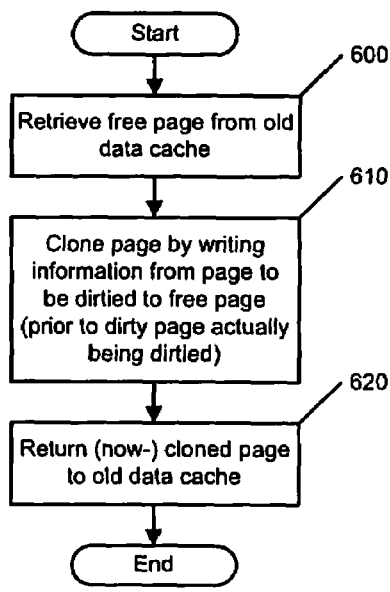
FIG. 6 is a flow diagram illustrating a process for writing a page to a cloned page cache according to embodiments of the present invention.

FIG. 6 is a flow diagram illustrating a process for writing a page to an old data cache according to embodiments of the present invention. First, a free page is retrieved from the old data cache (e.g., old data cache 240) (step 600). Next, the existing data of the page to be dirtied is cloned by writing information therefrom (i.e., the page to be cloned) to a free page from the old data cache (step 610). As will be appreciated, this operation needs to be performed prior to the dirty page actually being dirtied. Now that the old data has been saved to the free page (and so resulting in a cloned page), the cloned page can now be returned to the old data cache (step 620). In doing so, the cloned page is now made available to the volume manager (given that the old data cache is actually managed and maintained by the volume manager).

Figure 7:
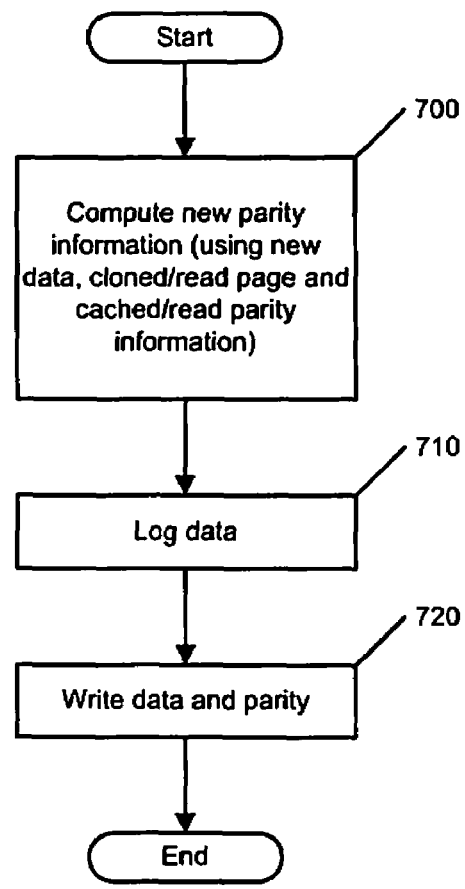
FIG. 7 is a flow diagram illustrating a modify/log/write process according to embodiments of the present invention.

FIG. 7 is a flow diagram illustrating a read/modify/write process according to embodiments of the present invention. As noted, since the filesystem has returned the cloned page to the old data cache, the volume manager now has access to that cloned page in the old data cache, and is able to use the cloned page in the same manner as if the volume manager were to have read that page from disk storage. As will be apparent to one skilled in the art, such caching not only saves time, but enjoys a 100% hit-rate, as a result of the knowledge that, at the time an item is cached, each cached item (i.e., cloned page) in the cache (i.e., old data cache or old data cache 240) will be needed. Thus, a technique according to the present invention not only provides faster storage processing, it does so with a maximum of efficiency.

The process of modifying/logging/writing performed by the volume manager begins with the computation of parity information, using the new data, the cloned page and cached parity information, assuming that such caching is feasible (step 700). It will be noted that, in fact, given the possibility of read operations being required notwithstanding the techniques of the present invention, these parity computations may need to be performed on the pages and parity information thus read. As before, once the parity calculations have been performed, data is logged to a data log (step 710). Also as before, data and parity information are then written to disk storage (step 720).

Figure 8:
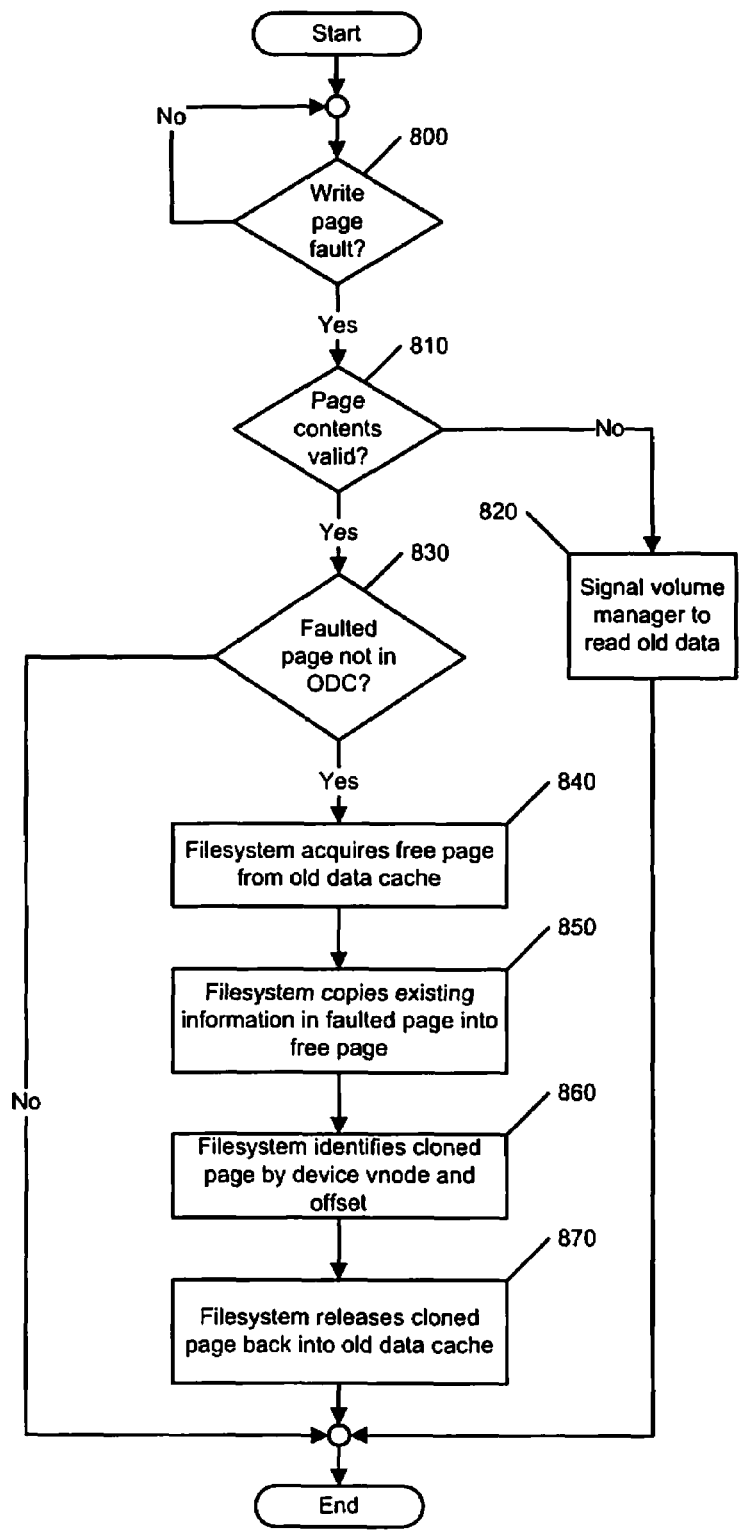
FIG. 8 is a flow diagram illustrating a process of page cloning using memory mapped access, in which the volume manager maintains the old data cache, according to embodiments of the present invention.

FIG. 8 is a flow diagram illustrating a process of page cloning using memory mapped access according to embodiments of the present invention. In this process, a volume manager, such as lower-level storage module 220, maintains a set of pages that are used as an "old data cache" (also referred to herein as an ODC), in the manner of old data cache 240. It will be noted that, given that these pages are unused when added to the cache, such pages do not have an identity initially. It will also be noted that the present example deals with memory mapped access, and although the process is similar to that for write access, each type of access will follow different code paths.

A memory mapped access process according to the present invention begins with a determination as to whether a write page fault has occurred (step 800). Once a write page fault occurs, a determination is made as to whether the contents of the faulted page are valid (step 810). If the contents of the faulted page are not valid, a signal is sent to the volume manager, indicating that the volume manager should read the old data from disk storage, as would normally be the case (step 820). If needed (e.g., in the case of a write to a RAID-5 volume (as opposed to a volume having copy-on-write snapshots)), the volume manager also reads parity information at this point.

However, if the page's contents are valid, a determination is made as to whether the write-faulted page is already in the volume manager-managed old data cache (step 830). If the faulted page is already in the volume manager-managed old data cache, the volume manager already has access to the faulted page's data, and so is at liberty to complete the remaining phases of the write, once the write to the volume manager actually occurs. That being the case, the process of page cloning is complete.

If the faulted page is not in the volume manager's old data cache (step 830), the faulted page needs to be cloned. To accomplish this, the filesystem first acquires a free page from the old data cache managed by the volume manager (old data cache 240) (step 840). Next, the filesystem copies the faulted page's existing information into the free page (step 850). It is at this point that the free page becomes a cloned page, having the existing data written thereto. The filesystem then identifies the cloned page by the device's vnode (in contrast to the file vnode) and the offset to which the device vnode corresponds (step 860). Finally, the filesystem releases the cloned page back into the old data cache (step 870). In doing so, the filesystem makes the cloned page available to the volume manager in a manner that is transparent to the volume manager (given that the volume manager is tasked with managing the old data cache (and so, by definition, has access to the old data cache)).

Figure 9:
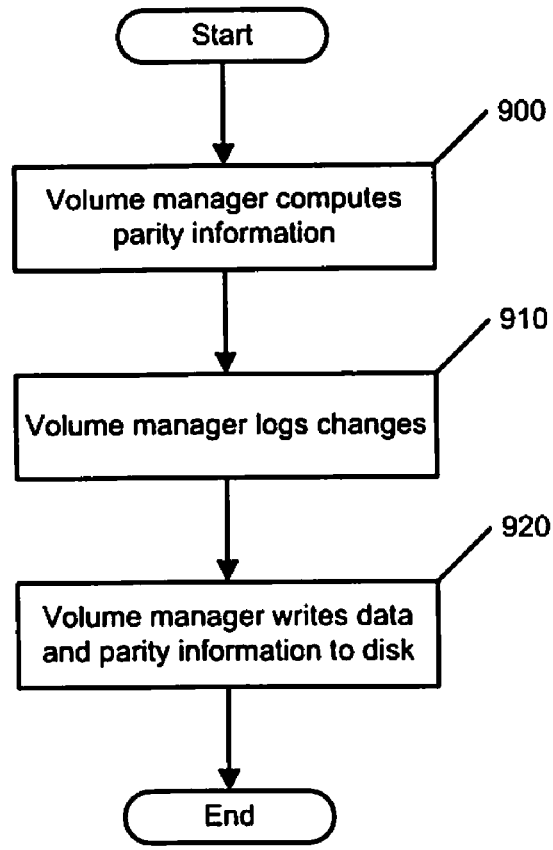
FIG. 9 is a flow diagram illustrating a modify/log/write process according to embodiments of the present invention.

FIG. 9 is a flow diagram illustrating a modify/log/write process according to embodiments of the present invention. This process depicts the remaining phases of a partial stripe write, for example, performed by a volume manager of the present invention. The process begins with the volume manager calculating new parity information from the cloned page, the old parity information (from the parity cache) and the new data (step 900). The volume manager then logs these changes to a data log (step 910). As has been noted, the use of a logging mechanism provides two major advantages: fast parity resynchronization (in the case of a system failure, the log file can be used to re-create the transactions that occurred (rather than rebuilding from scratch using only the data and parity information), and recovery in the case of a "1½" failure (in which a system crash occurs (losing one or more writes to a first volume) and a column failure occurs (in which a disk is lost)). Finally, in completing the write operation that these phases represent, the volume manager writes data and parity information to disk storage, thus completing the write operation (step 920).

Figure 10:
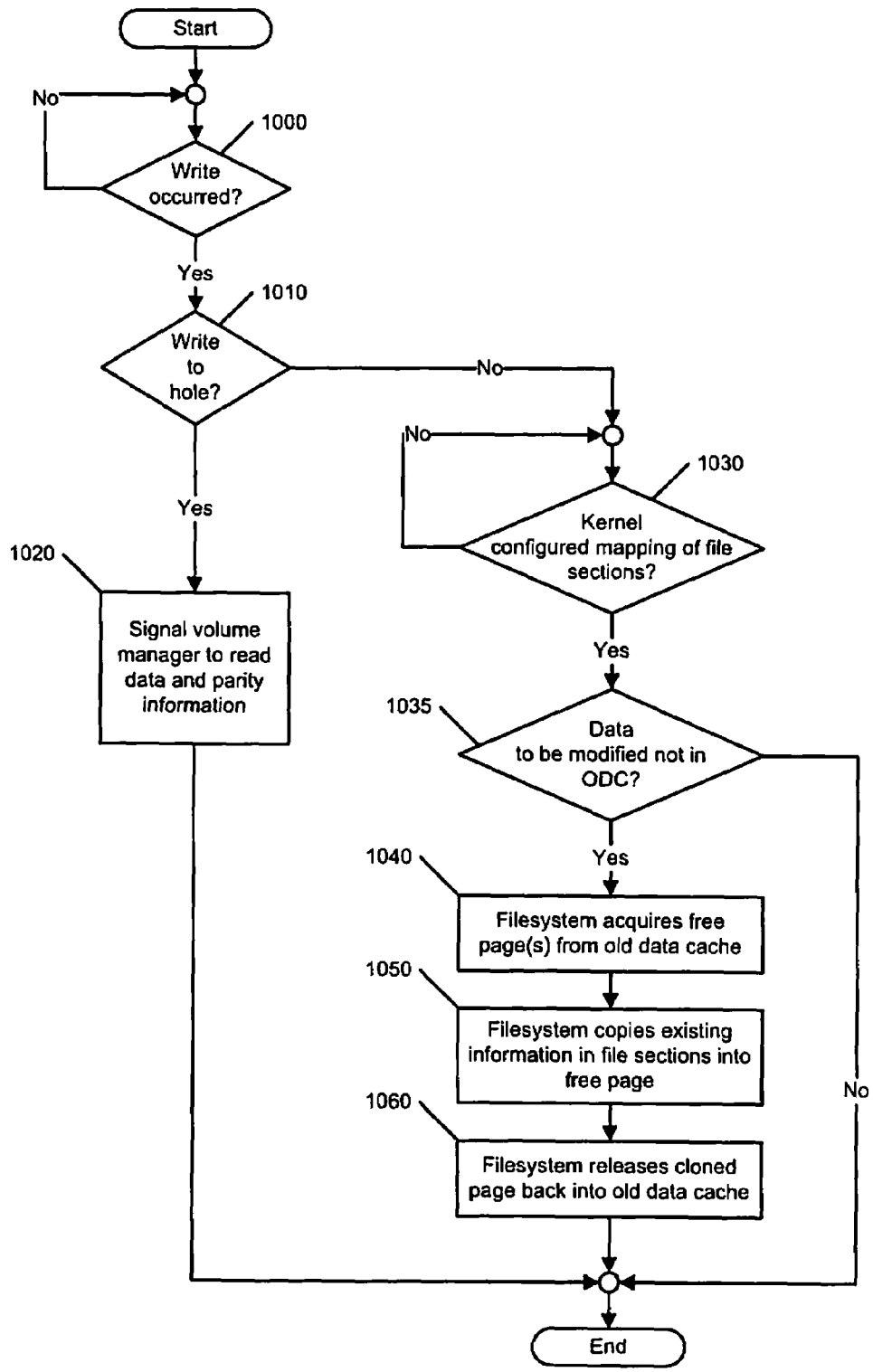
FIG. 10 is a flow diagram illustrating a process of page cloning using write access, according to embodiments of the present invention.

FIG. 10 is a flow diagram illustrating a process of page cloning using write access according to the present invention. Initially, a determination is made as to whether or not a write has occurred (step 1000). Once a write occurs, information regarding the write is analyzed to determine whether the write is to a "hole" (i.e., when a write is to an area in disk storage that has not previously been written to (and so the data therein would not be read, as it is not valid)) (step 1010). If the write is to a hole, a signal is sent to the volume manager, indicating that the volume manager should read ahead in order to cache the old data and old parity information (given that this is a RAID-with-parity scenario (e.g., RAID-5)) (step 1020).

If the write is not to a hole, a determination is made as to whether the kernel has completed the mapping of the relevant sections of the file being written to into memory before those sections are dirtied and written to disk (step 1030). Once the kernel has completed the mapping of the relevant sections of the file being written to into memory, a determination is made as to whether the data to be modified is cached in the old data cache (step 1035). If the data in question is already cached in the old data cache, no further action need be taken in this regard, and the kernel can proceed with writing the relevant file sections into memory and flushing that information to disk.

If the requisite data has not yet been cached in the old data cache, however, the filesystem acquires the necessary free page(s) from the old data cache (step 1040). The filesystem then copies the existing information from the file sections, into the free page(s) (step 1050). Having written the existing information into the free page(s) (thus making the page(s) into cloned page(s)), the filesystem releases the cloned page(s) back into the old data cache (step 1060).

Figure 11:
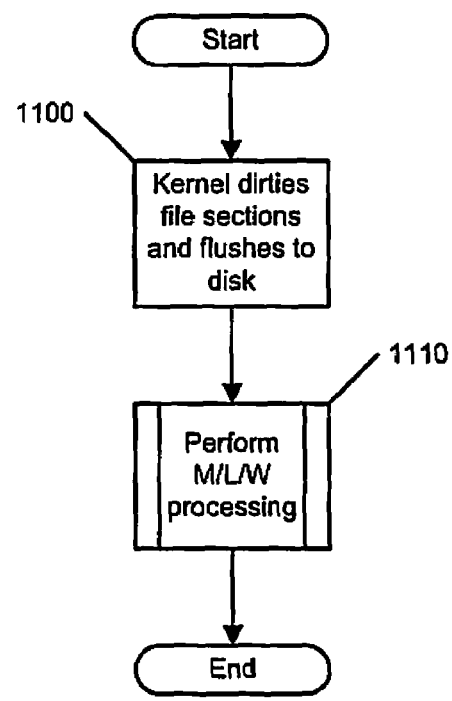
FIG. 11 is a flow diagram illustrating a read/modify/write process according to embodiments of the present invention.

FIG. 11 is a flow diagram illustrating a modify/log/write process according to embodiments of the present invention. The filesystem, having released the cloned page into the old data cache, has, in doing so, made the cloned page available to the volume manager. The kernel is now free to dirty the file sections as needed, and to flush these sections to disk (step 1100). In response, the volume manager can now perform modify/log/write processing on the page(s) in question, according to the present invention, as it normally would in performing such operations (step 1110).

Example Processes for Partial Stripe Writes Using Page Cloning

Figure 12:
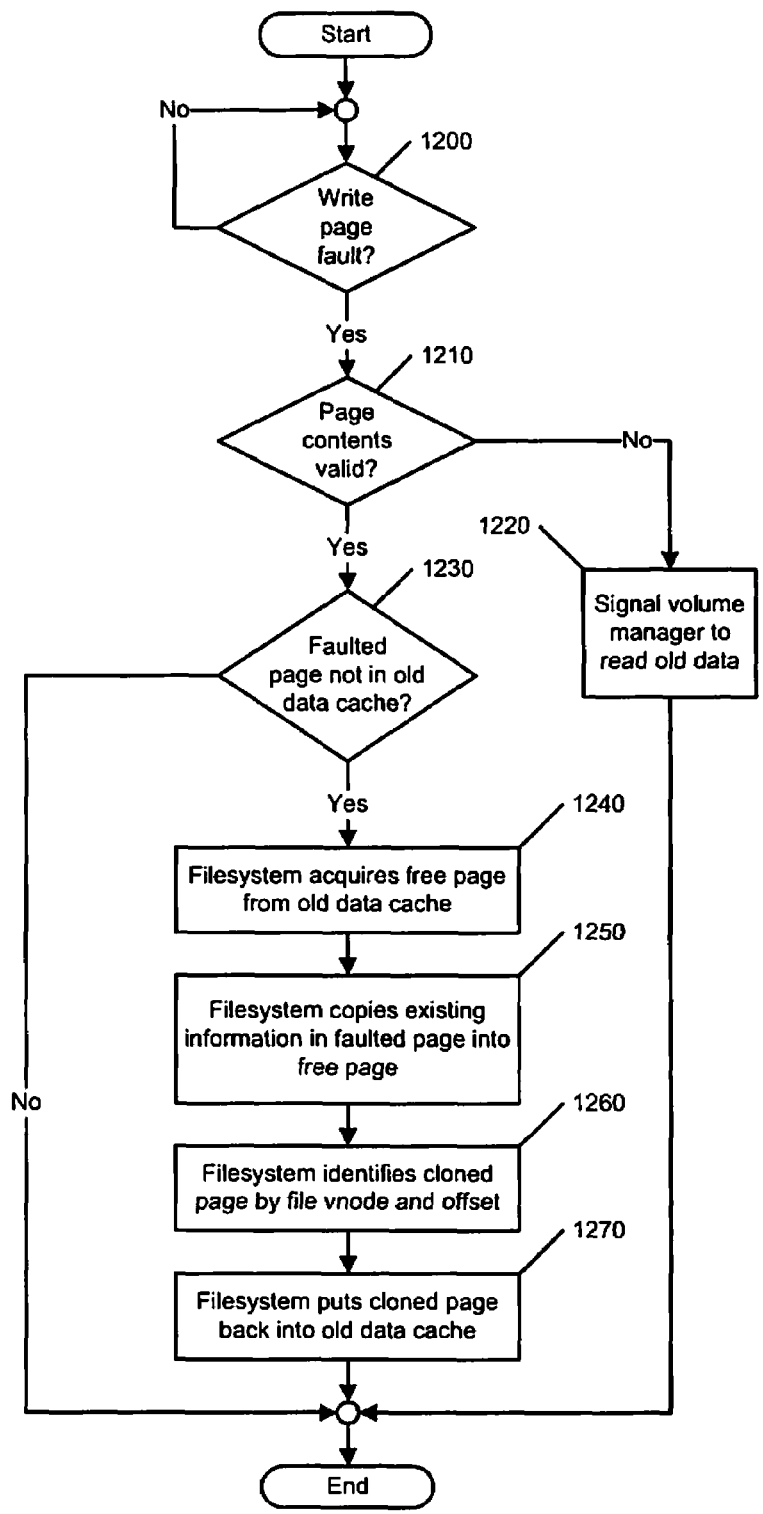
FIG. 12 is a flow diagram illustrating a process of page cloning using a filesystem-managed old data cache, according to embodiments of the present invention.

FIG. 12 is a flow diagram illustrating a process of page cloning using an old data cache maintained by the filesystem, according to embodiments of the present invention. Such a process begins with a determination as to whether a write page fault has occurred (step 1200). Once a page fault has occurred, a determination is made as to whether the contents of the faulted page are valid (step 1210). If the page contents are not valid, a signal is sent to the volume manager, indicating that the volume manager should read the old data existing in disk storage (and potentially, old parity information (e.g., in the case of a RAID-5 system)), in the conventional manner (step 1220). However, if the page contents are valid, a determination is made as to whether the faulted page has already been cloned (and so is available in the old data cache) (step 1230). As will be appreciated, if the faulted page is already in the old data cache, the page need not be (re-)cloned.

Thus, if the faulted page is not in the old data cache, the filesystem proceeds with cloning the page. The filesystem accomplishes this goal by first acquiring a free page from the old data cache (step 1240). The filesystem then copies the existing information from the faulted page into the free page (thus making the free page a cloned page) (step 1250). The filesystem then identifies the cloned page by a file vnode and an offset corresponding to the file vnode (step 1260). Finally, the filesystem puts the cloned page back into the old data cache (step 1270). More generally, as will be appreciated, the scenarios discussed herein with regard to the use of a volume manager-managed old data cache (e.g., a memory mapped situation) can be addressed with equal success using an old data cache maintained by the filesystem, such as that just discussed in connection with FIG. 12.

Example Processes for Storage Systems Employing Copy-on-Write Snapshots

Writes to Volumes Subject to Copy-on-Write Snapshots

Figure 13A:
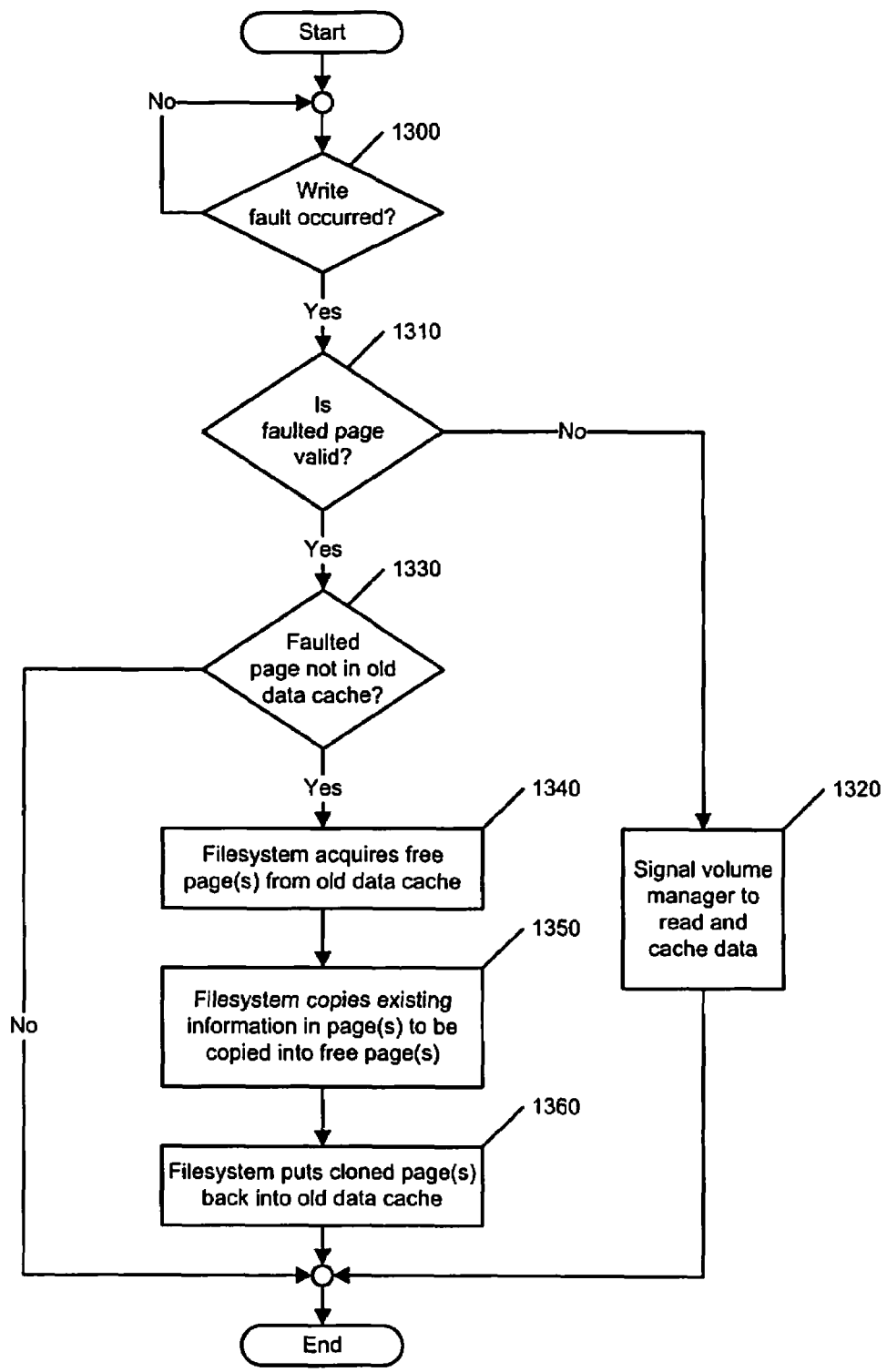
FIG. 13A is a flow diagram illustrating a process of page cloning using a filesystem-managed old data cache when writing to a volume having copy-on-write snapshots, according to embodiments of the present invention.

FIG. 13A is a flow diagram illustrating a process for page cloning in the situation in which a filesystem is mounted on a volume having copy-on-write snapshots. As noted earlier, the page cloning technique of the present invention can be used effectively to optimize writes to volumes having copy-on-write snapshots. As also noted, a write to a volume having copy-on-write snapshots may require that the volume read the old contents of the region to be written, and to copy them to the copy-on-write snapshots prior to actually overwriting the region with new application data. Moreover, a technique according to the present invention optimizes reads to snapshot volumes, as well as partial writes to snapshot volumes, in storage systems employing copy-on-write snapshots, as discussed subsequently.

The process of page cloning in a copy-on-write snapshot scenario begins with a determination as to whether a write has occurred (step 1300). Once a write has occurred, a determination is made as to whether the faulted page is valid (step 1310). If the page is not valid, the filesystem sends a signal to the volume manager indicating that the volume manager should read the old data from disk storage, as it normally would, and cache the old data in the old data cache (step 1320). If the page is valid, a determination is made as to whether the requisite page already exists in the old data cache (step 1330). If the requisite page is already in the old data cache, no further actions need be taken with regard to caching that information. This allows the copying of the page's existing data, and the writing of the new application data to be performed by volume manager using the previously-cached page.

If the requisite data is not in the old data cache, the filesystem performs the operations necessary to clone the page, and so cache the old contents. First, the filesystem acquires a free page from the old data cache (step 1340). The filesystem then copies the existing information from the page to be written to, to the free page (step 1350). The filesystem then puts the cloned page back into the old data cache (step 1360).

Figure 13B:
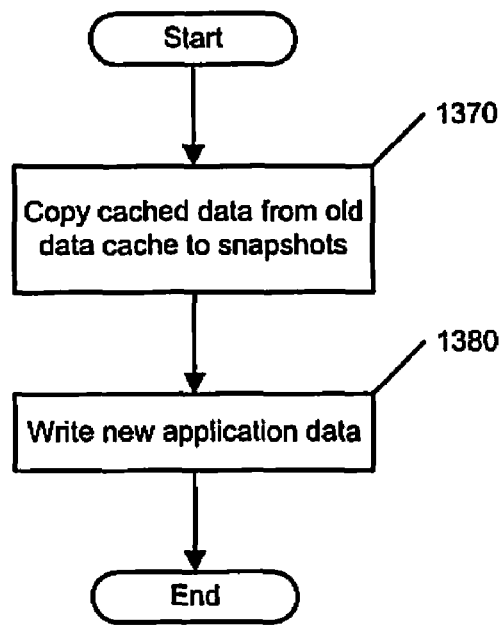
FIG. 13B is a flow diagram illustrating a process of copying and writing data when writing to a volume having copy-on-write snapshots, according to embodiments of the present invention.

FIG. 13B is a flow diagram illustrating a process of copying and writing data when writing to a volume having copy-on-write snapshots, according to embodiments of the present invention. The process begins with copying the data from the old data cache to the snapshot (step 1370). It will be appreciated that this can cover the situation in which the old data is read (in which case the data is read into the old data cache) or is copied into the old data cache as part of the operations of the present invention. In either case, the requisite (old) data will be available from the old data cache. Once the data is copied to the snapshots, the new application data can be written to disk storage (step 1380).

Reads to Copy-on-Write Snapshot Volumes

The process of an application (e.g., a filesystem) reading from a snapshot volume in a copy-on-write snapshot scenario can also benefit from techniques according to the present invention. In a volume having copy-on-write snapshots, the volume containing the original data is referred to as a source volume (as it is the source of the original data). In the conventional case, a read from a snapshot volume involves a determination as to whether the (latest) data for those blocks reside on the snapshot volume, or on the source volume. The latter would be the case, for example, where there had been no writes to those blocks on the source volume. As will be appreciated, if the desired information is on the source volume, the source volume must be read to retrieve (the most recent version of) the desired information. However, as in the other scenarios discussed herein, if the desired information has already been cloned (e.g., by a filesystem mounted on the source volume), that information is readily available, thus avoiding the need to perform a read operation on the disk storage. Thus, in the case where a read is performed on the snapshot volume and the most recent version of the desired data resides on the source volume, the source volume need not be read if the desired information has already been cloned (and is thus available from the old data cache).

Partial Region Writes to Copy-on-Write Snapshot Volumes

The process of a partial region write to a snapshot volume in a copy-on-write snapshot scenario can also benefit from techniques according to the present invention. Typically, data in storage systems is dealt with on the basis of regions (which, in turn, contain some standard number of blocks), or some other unit of storage of the storage unit. For example, a region might contain 64 KB of data. Also typically, some sort of metadata is kept, indicating whether the most current version of a region's data is currently kept in the source volume or the snapshot volume. The present invention can be used to improve the performance of partial writes (e.g., partial region writes) to the snapshot volume of such systems (e.g., in the situation where a decision support system writes a partial region to the snapshot volume).

It will be appreciated that situations will exist in which something less than a full region (e.g., even a single block) may need to be written to a snapshot volume (e.g., an application may write data amounting to something less than a full region). As noted, such a scenario is referred to as a partial region write (or, more generally, a partial write). However, writes to a snapshot volume are conventionally limited to a minimum unit of storage (e.g., a region), due to the burdensome nature of maintaining metadata using smaller units of storage. In writing to a snapshot volume, then, the copying of data from the source volume to the snapshot volume is normally performed on a region-by-region basis (as a result of the limitations mandated the copy-on-write snapshot paradigm).

Conventionally, in the case where the most recent version of data in a given region is currently kept on the source volume (as indicated by the log) and new data is to be written to a partial region on the snapshot volume (corresponding to the aforementioned region on the source volume), the region on the source volume (containing the most recent version of the data) is read. The given region of the snapshot volume is then written with either the new data (on the appropriate portion of the region) or the most recent version of the data from the source volume (on the remaining portion of the region). Thus, if the most current data resides on a region of the source volume and the corresponding region of the snapshot volume is to be written, that region of the source volume must be read in order to properly complete the write to the snapshot volume.

By contrast, in a storage architecture according to the present invention, the reading of the most recent version of the data from the source volume need not be performed if that information has already been cloned in the old data cache. In that case, the volume manager can write the new data to the appropriate portion of the region of the snapshot volume (as it normally would), and the old data from the old data cache to the remaining portion of the region of the snapshot volume, thus completing the writing of that region of the snapshot volume without the need for reading from the source volume.

An Example Computing and Network Environment

Figure 14:
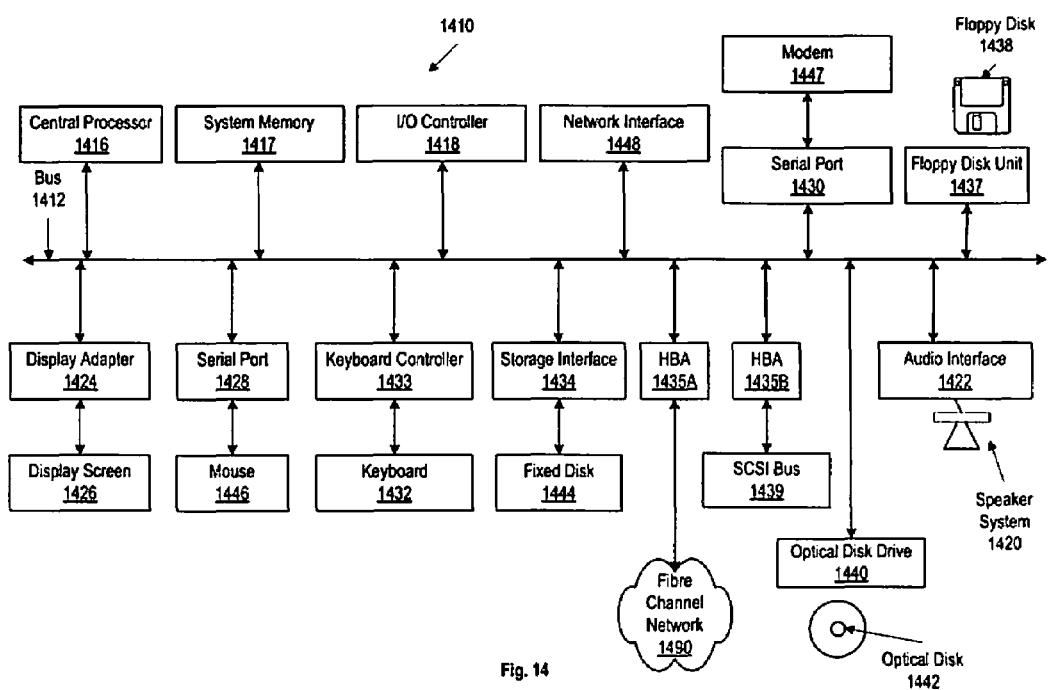
FIG. 14 is a block diagram illustrating an example computer system suitable for implementing the present invention.

FIG. 14 depicts a block diagram of a computer system 1410 suitable for implementing the present invention. Computer system 1410 includes a bus 1412 which interconnects major subsystems of computer system 1410, such as a central processor 1416, a system memory 1417 (typically RAM, but which may also include ROM, flash RAM, or the like), an input/output (I/O) controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a floppy disk unit 1437 operative to receive a floppy disk 1438, a host bus adapter (HBA) interface card 1435A operative to connect with a fibre channel network 1490, a host bus adapter (HBA) interface card 1435B operative to connect to a SCSI bus 1439, and an optical disk drive 1440 operative to receive an optical disk 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1412).

Bus 1412 allows data communication between central processor 1416 and system memory 1417, which may include read-only memory (ROM) or flash memory (neither shown), and random access memory (RAM) (not shown), as previously noted. The RAM is generally the main memory into which the operating system and application programs are loaded and typically affords at least 154 megabytes of memory space. The ROM or flash memory may contain, among other code, the Basic Input-Output system (BIOS) which controls basic hardware operation such as the interaction with peripheral components. Applications resident with computer system 1410 are generally stored on and accessed via a computer readable medium, such as a hard disk drive (e.g., a fixed disk 1444), an optical drive (e.g., optical disk drive 1440), floppy disk unit 1437 or other storage medium. Additionally, applications may be in the form of electronic signals modulated in accordance with the application and data communication technology when accessed via network modem 1447 or network interface 1448.

Storage interface 1434, as with the other storage interfaces of computer system 1410, may connect to a standard computer readable medium for storage and/or retrieval of information, such as fixed disk drive 1444. Fixed disk drive 1444 may be a part of computer system 1410 or may be separate and accessed through other interface systems. It will be apparent that a virtual loader of the present invention can be implemented, for example, using a hard disk drive such as fixed disk 1444. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 14 to be present to practice the present invention. The devices and subsystems may be interconnected in different ways from that shown in FIG. 14. The operation of a computer system such as that shown in FIG. 14 is readily known in the art and is not discussed in detail in this application. Code to implement the present invention may be stored in computer-readable storage media such as one or more of system memory 1417, fixed disk 1444, optical disk 1442, or floppy disk 1438. Additionally, computer system 1410 may be any kind of computing device, and so includes personal data assistants (PDAs), network appliance, X-window terminal or other such computing devices. The operating system provided on computer system 1410 may be MS-DOS®, MS-WINDOWS®, OS/2®, UNIX®, Linux®, or another known operating system. Computer system 1410 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 1410). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 15:
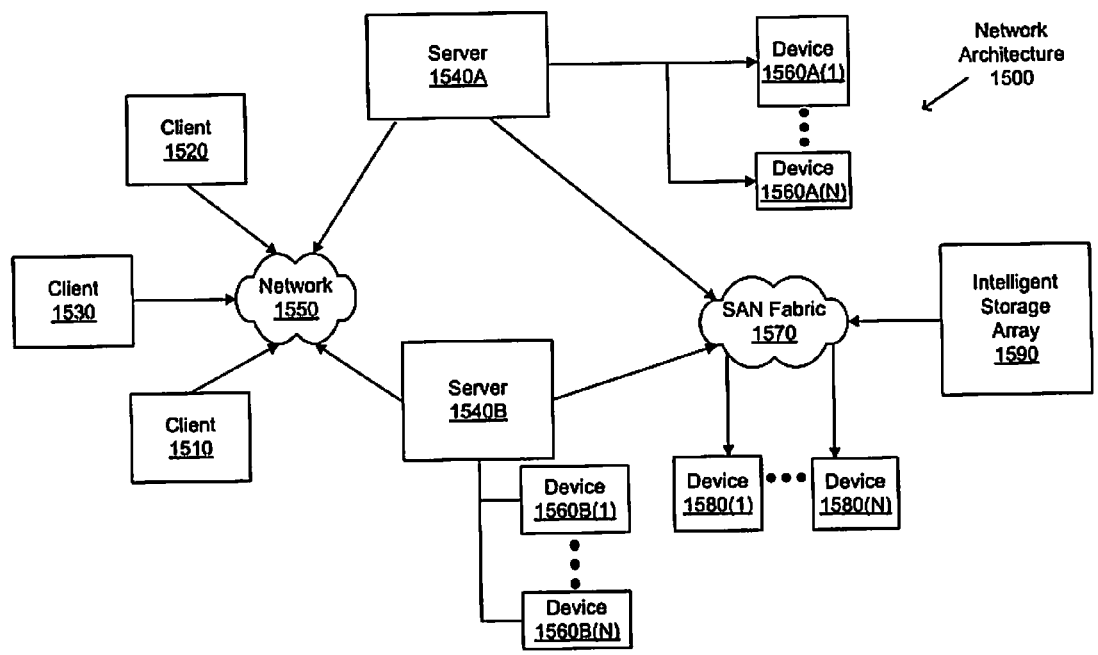
FIG. 15 is a block diagram illustrating a network architecture suitable for implementing the present invention.

FIG. 15 is a block diagram depicting a network architecture 1500 in which client systems 1510, 1520 and 1530, as well as storage servers 1540A and 1540B (any of which can be implemented using a computer system such as computer system 1410), are coupled to a network 1550. Storage server 1540A is further depicted as having storage devices 1560A(1)-(N) directly attached, and storage server 1540B is depicted with storage devices 1560B(1)-(N) directly attached. Storage servers 1540A and 1540B are also connected to a SAN fabric 1570, although connection to a storage area network is not required for operation of the invention. SAN fabric 1570 supports access to storage devices 1580(1)-(N) by storage servers 1540A and 1540B, and so by client systems 1510, 1520 and 1530 via network 1550. Intelligent storage array 1590 is also shown as an example of a specific storage device accessible via SAN fabric 1570. As will be apparent, a virtual loader of the present invention can also be implemented, for example, using one or more storage devices such as storage devices 1560A(1)-(N), storage devices 1560B(1)-(N) or storage devices 1580(1)-(N) (via SAN fabric 1570).

It will be noted that the variable identifier "N" is used in several instances in FIG. 15 to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

With reference to computer system 1410, modem 1447, network interface 1448 or some other method can be used to provide connectivity from each of client computer systems 1510, 1520 and 1530 to network 1550. Client systems 1510, 1520 and 1530 are able to access information on storage server 1540A or 1540B using, for example, a web browser or other client software (not shown). Such a client allows client systems 1510, 1520 and 1530 to access data hosted by storage server 1540A or 1540B or one of storage devices 1560A(1)-(N), 1560B(1)-(N), 1580(1)-(N) or intelligent storage array 1590. FIG. 15 depicts the use of a network such as the Internet for exchanging data, but the present invention is not limited to the Internet or any particular network-based environment.

While particular embodiments of the present invention have been shown and described, it will be apparent to those skilled in the art that, based upon the teachings herein, changes and modifications may be made without departing from this invention and its broader aspects and, therefore, the appended claims are to encompass within their scope all such changes and modifications as are within the true scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A method comprising:
    maintaining a first cache, wherein
        said maintaining is performed by one of an upper-level system and a lower-level storage module, and
        said first cache is configured to provide read access and write access by said one of said upper-level system and said lower-level storage module;
    cloning information stored in a first unit of storage into a second unit of storage, wherein
        said first cache comprises said first unit of storage and a second cache comprises said second unit of storage; and
    accessing said second cache, wherein
        said accessing is performed by the other of said upper-level system and said lower-level storage module,
        said second cache is configured to provide read access and write access by said other of said upper-level system and said lower-level storage module, and
        said accessing is performed using at least one of a set of interfaces, wherein said set of interfaces is exported from said one of said upper-level system and said lower-level storage module to said other of said upper-level system and said lower-level storage module.

2. The method of claim 1 wherein said first cache is maintained by said upper-level system.

3. The method of claim 2, wherein
    a single cache comprises said first and said second caches.

4. The method of claim 2, further comprising:
    partially writing a unit of storage of a storage unit by writing a portion of said information from said second unit of storage to said unit of storage of said storage unit; and partially writing said unit of storage of said storage unit by writing new information to said unit of storage of said storage unit.

5. The method of claim 2, wherein said cloning comprises:
reading said information from said first unit of storage; and
writing said information to said second unit of storage.

6. The method of claim 5, further comprising:
writing to said first unit of storage after said reading.

7. The method of claim 5, further comprising:
reading said information from said second unit of storage; and
calculating parity information using said information.

8. The method of claim 2, wherein said cloning comprises:
said first unit of storage is to be modified if said first unit of storage is to be written to.

9. The method of claim 2, further comprising:
reading said information from said second unit of storage; and
calculating parity information using said information.

10. The method of claim 2, further comprising:
modifying said first unit of storage after said performing said cloning.

11. The method of claim 10, wherein said modifying comprises:
writing to said first unit of storage.

12. The method of claim 2, wherein said cloning comprises:
determining if said information will be needed in the future; and
performing said cloning if said information will be needed in the future.

13. The method of claim 1 further comprising freeing said second unit of storage.

14. The method of claim 1 wherein said upper-level system manages cloned information in said second cache via an application programming interface (API).

15. The method of claim 1 further comprising copying said second unit of storage to a copy-on-write snapshot.

16. A storage system comprising:
an old data cache, wherein
said old data cache is configured to be maintained by one of an upper-level system and a lower-level storage module by virtue of said old data cache being configured to provide read access and write access by said one of said upper-level system and said lower-level storage module, and
said old data cache is further configured to be accessed by the other of said upper-level system and said lower-level storage module by virtue of said old data cache being configured to provide read access and write access by said other of said upper-level system and said lower-level storage module, wherein said access is performed using at least one of a set of interfaces, wherein said set of interfaces is exported from said one of said upper-level system and said lower-level storage module to said other of said upper-level system and said lower-level storage module.

17. The storage system of claim 16,
wherein said upper-level system is communicatively coupled to said old data cache; and
said lower-level storage module is communicatively coupled to said old data cache and said upper-level system.

18. The storage system of claim 17, wherein
said lower-level storage module is a volume manager.

19. The storage system of claim 18, wherein said lower-level storage module comprises a cache.

20. The storage system of claim 19, wherein
said lower-level storage module is configured to clone information from a page in said cache to a page in said old data cache.

21. The storage system of claim 20, wherein
said upper-level system is configured to access said page in said old data cache.

22. The storage system of claim 17, wherein said upper-level system comprises a cache.

23. The storage system of claim 22, wherein
said upper-level system is configured to clone information from a page in said cache to a page in said old data cache.

24. The storage system of claim 23, wherein
said lower-level storage module is configured to access said page in said old data cache.

25. The storage system of claim 22, wherein
said upper-level system is one of a filesystem, a database and a hardware RAID controller.

26. The storage system of claim 17, further comprising:
storage unit, wherein
said lower-level storage module is coupled to control said storage unit.

27. The storage system of claim 26, further comprising:
a parity cache, wherein
said storage unit is a RAID, and
said parity cache is configured to store parity information corresponding to data read from said RAID.

28. The storage system of claim 26, wherein
said storage unit comprises a source volume and a snapshot volume, and
said lower-level storage module is configured to write information from a page in said old data cache to said snapshot volume.

29. An apparatus comprising:
an upper-level system comprising a first cache, wherein
said first cache is configured to provide read access and write access by said upper-level system;
a second cache, wherein
said second cache is configured to provide read access and write access by a lower-level storage module; and
means for cloning information stored in a first unit of storage into a second unit of storage, wherein
said first unit of storage is stored in said first cache,
said second unit of storage is stored in said second cache, and
said second cache is configured to be accessed by said lower-level storage module, wherein said access is performed using at least one of a set of interfaces, wherein said set of interfaces is exported from said lower-level storage module to said upper-level system.

30. The apparatus of claim 29, wherein
said means for cloning comprises
means for copying said information from said first unit of storage to said second unit of storage; and
said apparatus further comprises
means for partially writing a unit of storage of a storage unit comprising means for writing a portion of said information from said second unit of storage to said unit of storage of said storage unit, and
means for partially writing said unit of storage of said storage unit comprising means for writing new information to said unit of storage of said storage unit.

31. The apparatus of claim 29, wherein
said means for cloning comprises
means for reading said information from said first unit of storage, and means for writing said information to said second unit of storage; and said apparatus further comprises
 means for writing to said unit of storage, operable to write to said unit of storage after an operation of said means for reading.

32. A storage system comprising:
an upper-level system comprising a first cache, wherein
 said first cache is configured to provide read access and write access by said upper-level system;
a second cache, wherein
 said second cache is configured to provide read access and write access by a lower-level storage module;
a processor;
computer readable medium coupled to said processor; and
computer code, encoded in said computer readable medium, configured to cause said processor to:
 clone information stored in a first unit of storage into a second unit of storage, wherein
  said first unit of storage is stored in a first cache maintained by an upper-level system, and
  said second unit of storage is stored in a second cache configured to be accessed by a lower-level storage module, wherein said access is performed using at least one of a set of interfaces, wherein said set of interfaces is exported from said lower-level storage module to said upper-level system.

33. The storage system of claim 32, wherein
said computer code configured to cause said processor to clone said information is further configured to cause said processor to copy said information from said first unit of storage to said second unit of storage; and
said computer code is further configured to cause said processor to
 partially write a unit of storage of a storage unit by virtue of being configured to write a portion of said information from said second unit of storage to said unit of storage of said storage unit, and
 partially write said unit of storage of said storage unit by virtue of being configured to write new information to said unit of storage of said storage unit.

34. The storage system of claim 32, wherein
said computer code configured to cause said processor to read said information from said first unit of storage, and write said information to said second unit of storage; and
said computer code is further configured to cause said processor to write to said unit of storage after said reading.

35. A computer program product comprising:
a first set of instructions, executable on a computer system, configured to clone information stored in a first unit of storage into a second unit of storage, wherein
 said first unit of storage is stored in a first cache maintained by an upper-level system,
 said second unit of storage is stored in a second cache configured to be accessed by a lower-level storage module, wherein said access is performed using at least one of a set of interfaces, wherein said set of interfaces is exported from said lower-level storage module to said upper-level system,
 said first cache is configured to provide read access and write access by said upper-level system, and
 said second cache is configured to provide read access and write access by said lower-level storage module; and
computer readable storage media, wherein said computer program product is encoded in said computer readable storage media.

36. The computer program product of claim 35,
wherein said first set of instructions comprises
 a first subset of instructions, executable on said computer system, configured to clone said information is further configured to cause said processor to copy said information from said first unit of storage to said second unit of storage; and
said computer program product further encodes:
 a second set of instructions, executable on said computer system, configured to partially write a unit of storage of a storage unit by virtue of being further configured to cause said processor to write a portion of said information from said second unit of storage to said unit of storage of said storage unit, and
 a third set of instructions, executable on said computer system, configured to partially write said unit of storage of said storage unit by virtue of being further configured to cause said processor to write new information to said unit of storage of said storage unit.

37. The computer program product of claim 35,
wherein said first set of instructions comprises
 a first subset of instructions, executable on said computer system, configured to read said information from said first unit of storage, and
 a second subset of instructions, executable on said computer system, configured to write said information to said second unit of storage; and
said computer program product further encodes:
 a second set of instructions, executable on said computer system, configured to write to said unit of storage after said reading.

* * * * *